United States Patent
Mizutani et al.

(10) Patent No.: US 8,461,972 B2
(45) Date of Patent: Jun. 11, 2013

(54) MOVABLE OBJECT PERIPHERY MONITORING SYSTEM AND METHOD FOR CONTROLLING DATA TRANSMISSION IN THE SAME

(75) Inventors: Hiroaki Mizutani, Kariya (JP); Yuuko Nakamura, Kariya (JP); Teruhiro Tsujioka, Kariya (JP)

(73) Assignee: DENSO CORPORATION, Kariya (JP)

( * ) Notice: Subject to any disclaimer, the term of this patent is extended or adjusted under 35 U.S.C. 154(b) by 358 days.

(21) Appl. No.: 12/805,899

(22) Filed: Aug. 24, 2010

(65) Prior Publication Data
US 2011/0102163 A1    May 5, 2011

(30) Foreign Application Priority Data

Oct. 30, 2009    (JP) ................................ 2009-250437

(51) Int. Cl.
| | |
|---|---|
| B60Q 1/00 | (2006.01) |
| G08G 1/00 | (2006.01) |
| H04N 7/00 | (2006.01) |
| G06K 9/00 | (2006.01) |
| G06K 9/64 | (2006.01) |
| B60L 1/00 | (2006.01) |
| G06F 7/00 | (2006.01) |
| G05D 1/02 | (2006.01) |

(52) U.S. Cl.
USPC ........ 340/425.5; 340/435; 340/436; 340/901; 382/100; 382/276; 701/36; 701/300; 307/9.1; 348/36

(58) Field of Classification Search
None
See application file for complete search history.

(56) References Cited

U.S. PATENT DOCUMENTS

| | | | | |
|---|---|---|---|---|
| 5,304,980 A | * | 4/1994 | Maekawa ...................... 340/435 |
| 5,539,657 A | * | 7/1996 | Utsumi et al. .................. 725/75 |
| 5,793,308 A | * | 8/1998 | Rosinski et al. ............. 340/903 |
| 6,587,968 B1 | * | 7/2003 | Leyva .............................. 714/43 |
| 7,027,616 B2 | * | 4/2006 | Ishii et al. ..................... 382/104 |
| 7,379,041 B2 | * | 5/2008 | Knee et al. ....................... 345/88 |
| 7,728,722 B2 | * | 6/2010 | Kageyama et al. ........... 340/461 |

(Continued)

FOREIGN PATENT DOCUMENTS

| | | |
|---|---|---|
| JP | A-11-098490 | 4/1999 |
| JP | A-2000-043764 | 2/2000 |

(Continued)

OTHER PUBLICATIONS

Office Action mailed Sep. 20, 2011 in corresponding JP application No. 2009-250437 (and English translation).

Primary Examiner — George Bugg
Assistant Examiner — Renee Dorsey
(74) Attorney, Agent, or Firm — Posz Law Group, PLC

(57) ABSTRACT

A transmission device includes a transmitter and a receiver and transmits an image signal of an image of a periphery of a movable object from an imaging device to a display device near a driver of the movable object. The transmitter transmits an image signal to the receiver through a first transmission path and a second transmission path. The transmitter adds error detection information to each unit data item of a screen of the display device to generate an image signal. The receiver detects an error in the first transmission path using the error detection information. When continuously detecting an error in multiple transmitted unit data items, the receiver determines that malfunction occurs in a transmission state of the first transmission path and selects an image signal transmitted through the second transmission path instead of an image signal transmitted through the first transmission path.

27 Claims, 8 Drawing Sheets

U.S. PATENT DOCUMENTS

| | | | |
|---|---|---|---|
| 7,920,056 B2 * | 4/2011 | Hattori et al. | 340/441 |
| 2001/0019363 A1 | 9/2001 | Katta et al. | |
| 2005/0162261 A1 * | 7/2005 | Li | 340/435 |
| 2006/0164230 A1 * | 7/2006 | DeWind et al. | 340/461 |
| 2007/0115138 A1 * | 5/2007 | Arakawa | 340/901 |
| 2007/0236364 A1 * | 10/2007 | Hubbard et al. | 340/932.2 |
| 2008/0030311 A1 * | 2/2008 | Dayan et al. | 340/435 |
| 2008/0238192 A1 | 10/2008 | Hashimoto et al. | |

FOREIGN PATENT DOCUMENTS

| | | |
|---|---|---|
| JP | A-2000-076149 | 3/2000 |
| JP | A-2002-077174 | 3/2002 |
| JP | A-2002-314556 | 10/2002 |
| JP | A-2003-273950 | 9/2003 |
| JP | A-2004-064626 | 2/2004 |
| JP | A-2006-054681 | 2/2006 |
| JP | A-2006-240610 | 9/2006 |
| JP | A-2006-295346 | 10/2006 |
| JP | A-2008-271461 | 11/2008 |
| JP | A-2009-172280 | 8/2009 |
| JP | A-2009-188830 | 8/2009 |
| JP | A-2009-207050 | 9/2009 |

* cited by examiner

MOVABLE OBJECT PERIPHERY MONITORING SYSTEM AND METHOD FOR CONTROLLING DATA TRANSMISSION IN THE SAME

CROSS REFERENCE TO RELATED APPLICATIONS

This application is based on and incorporates herein by reference Japanese Patent Application No. 2009-250437 filed on Oct. 30, 2009.

FIELD OF THE INVENTION

The present invention relates to a periphery monitoring system for monitoring periphery of a movable object. The present invention further relates to a method for controlling data transmission in the periphery monitoring system.

BACKGROUND OF THE INVENTION

A known periphery monitoring system is provided with an imaging device such as a camera to obtain an image around a movable object such as a vehicle. In such a system, the imaging device sends an image signal to a display device close to a user such as a driver of the movable object. The display device displays an image of an exterior of the movable object. Thus, a user can view the exterior of the movable object.

A driver tends to concentrate to the front of a movable object when traveling forward. When a driver of an automobile neglects checking of the rear side, the driver may cause a collision with a child, a building, or the like. With an imaging device indicating an image on the rear side of a movable object, a driver can prevent collision on the rear side by observing the rear side of the movable object indicated on a display device. In such a system, an in-vehicle information network system is necessary to enable a driver to view such an image on the rear side. For example, publications of Japanese Unexamined Patent Applications 2004-64626, 11-98490, 2003-273950, and 2000-43764 (JP-A-2004-64626, JP-A-11-98490, JPA-2003-273950, and JP-A-2000-43764) disclose information network systems for vehicles. JP-A-2004-64626, paragraph 0057 teaches an in-vehicle communication system for various electric devices, in which a bypass transmission path is used for transmission of data when malfunction occurs in a transmission path of data. In JP-A-11-98490, paragraph 0008, when malfunction occurs in one transmission path, the path is changed to another transmission path to enable indication of an image on a display device. In JP-A-2003-273950, paragraph 0005, determination of a communication error is made according to a relation between multiple components of bit data included in communication data and check data. JP-A-2000-43764 also discloses a technical art relevant to a communication system.

In general, a malfunction occurs in a communication system due to intermittent discontinuity caused by an induction noise, disconnection of a wiring cable, and the like. In JP-A-2004-64626, JP-A-11-98490, and JP-A-2003-273950, a transmission path may be erroneously determined to be occurring permanent malfunction even when intermittent discontinuity occurs and such intermittent discontinuity is deemed to recover immediately. In this case, a transmission path may be switched to another path even when such switching is not needed. When two systems of transmitters and receivers are connected with each other via wiring cables and when an impact or electromagnetic wave noise is imposed to a specific portion of a movable object, malfunction may simultaneously occur in information in the two systems.

SUMMARY OF THE INVENTION

In view of the foregoing and other problems, it is an object of the present invention to produce a periphery monitoring system for a movable object, the periphery monitoring system enabling to select a transmission path with sufficient reliability. It is another object of the present invention to produce a periphery monitoring system for a movable object, the periphery monitoring system enabling to secure a transmission path even when disturbance such as shock, electromagnetic wave noise, or the like occurs in a specific portion of the movable object. It is another object of the present invention to produce a method for controlling data transmission in the periphery monitoring system.

According to one aspect of the present invention, a movable object periphery monitoring system comprises of a transmission device including a transmitter and a receiver configured to transmit an image signal of an image of a periphery of a movable object from an imaging device to a display device near a driver of the movable object, using the transmitter and the receiver through a first transmission path and a second transmission path. The transmitter is configured to add error detection information to each unit data item of an indication screen of the display device to generate an image signal and transmit the image signal. The receiver is configured to detect an error in the first transmission path using the error detection information. The receiver is further configured to, when continuously detecting an error in a plurality of transmitted unit data items, determine that malfunction occurs in a transmission state of the first transmission path and select an image signal transmitted through the second transmission path instead of an image signal transmitted through the first transmission path.

According to another aspect of the present invention, a movable object periphery monitoring system comprises of a transmission device including a transmitter and a receiver configured to transmit an image signal of an image of a periphery of a movable object from an imaging device to a display device near a driver of the movable object, using the transmitter to the receiver through a first transmission path and a second transmission path. The transmitter is configured to add error detection information to each unit data item of an indication screen of the display device to generate an image signal and transmit the image signal. The receiver is configured to detect an error using the error detection information. The receiver is further configured to, when detecting an error in a first number of unit data item, determine that malfunction occurs in a transmission state of one of the first transmission path and the second transmission path in a first instance. The receiver is further configured to, when not detecting an error continuously in a second number of data unit items, determine that the one of the first transmission path and the second transmission path recovers to be normal in a second instance subsequent to the first instance. The first number is one or more. The second number is greater than the first number.

According to another aspect of the present invention, a movable object periphery monitoring system comprises of a transmission device including a transmitter and a receiver configured to transmit an image signal of an image of a periphery of a movable object from an imaging device to a display device near a driver of the movable object. The transmission device further includes a first transmission cable and a second transmission cable for forming a first transmission path and a second transmission path to connect the transmitter with the receiver. The transmission device is configured to transmit an image signal through the first transmission path and the second transmission path. The first transmission cable and the second transmission cable are respectively laid in a first wiring path and a second wiring path. The first wiring path and the second wiring path are spaced from each other in the movable object.

According to another aspect of the present invention, a method for controlling data transmission in a movable object periphery monitoring system configured to transmit an image signal of an image of a periphery of a movable object from an imaging device to a display device near a driver of the movable object using a transmitter and a receiver through a first transmission path and a second transmission path, the method comprises of adding error detection information to each unit data item of an indication screen of the display device to generate an image signal in the transmitter. The method further comprises of transmitting the generated image signal from the transmitter. The method further comprises of receiving the transmitted image signal by the receiver. The method further comprises of when continuously detecting an error in a plurality of transmitted unit data items through the first transmission path by the receiver using the error detection information: i) determining that malfunction occurs in a transmission state of the first transmission path by the receiver; and ii) selecting an image signal transmitted through the second transmission path instead of an image signal transmitted through the first transmission path by the receiver.

According to another aspect of the present invention, a method for controlling data transmission in a movable object periphery monitoring system configured to transmit an image signal of an image of a periphery of a movable object from an imaging device to a display device near a driver of the movable object using a transmitter and a receiver through a first transmission path and a second transmission path, the method comprises of adding error detection information to each unit data item of an indication screen of the display device to generate an image signal in the transmitter. The method further comprises of transmitting the generated image signal from the transmitter. The method further comprises of receiving the transmitted image signal by the receiver. The method further comprises of when detecting an error in a first number of unit data item by the receiver using the error detection information, determining that malfunction occurs in a transmission state of one of the first transmission path and the second transmission path in a first instance. The method further comprises of when not detecting an error continuously in a second number of data unit items, determining that the one of the first transmission path and the second transmission path recovers to be normal in a second instance subsequent to the first instance. The first number is one or more. The second number is greater than the first number.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

As follows, a movable object periphery monitoring system according to the first embodiment will be described with reference to FIG. 1 to FIG. 7. In the present embodiment, the movable object periphery monitoring system is applied to a vehicle periphery monitoring system.

Figure 1:
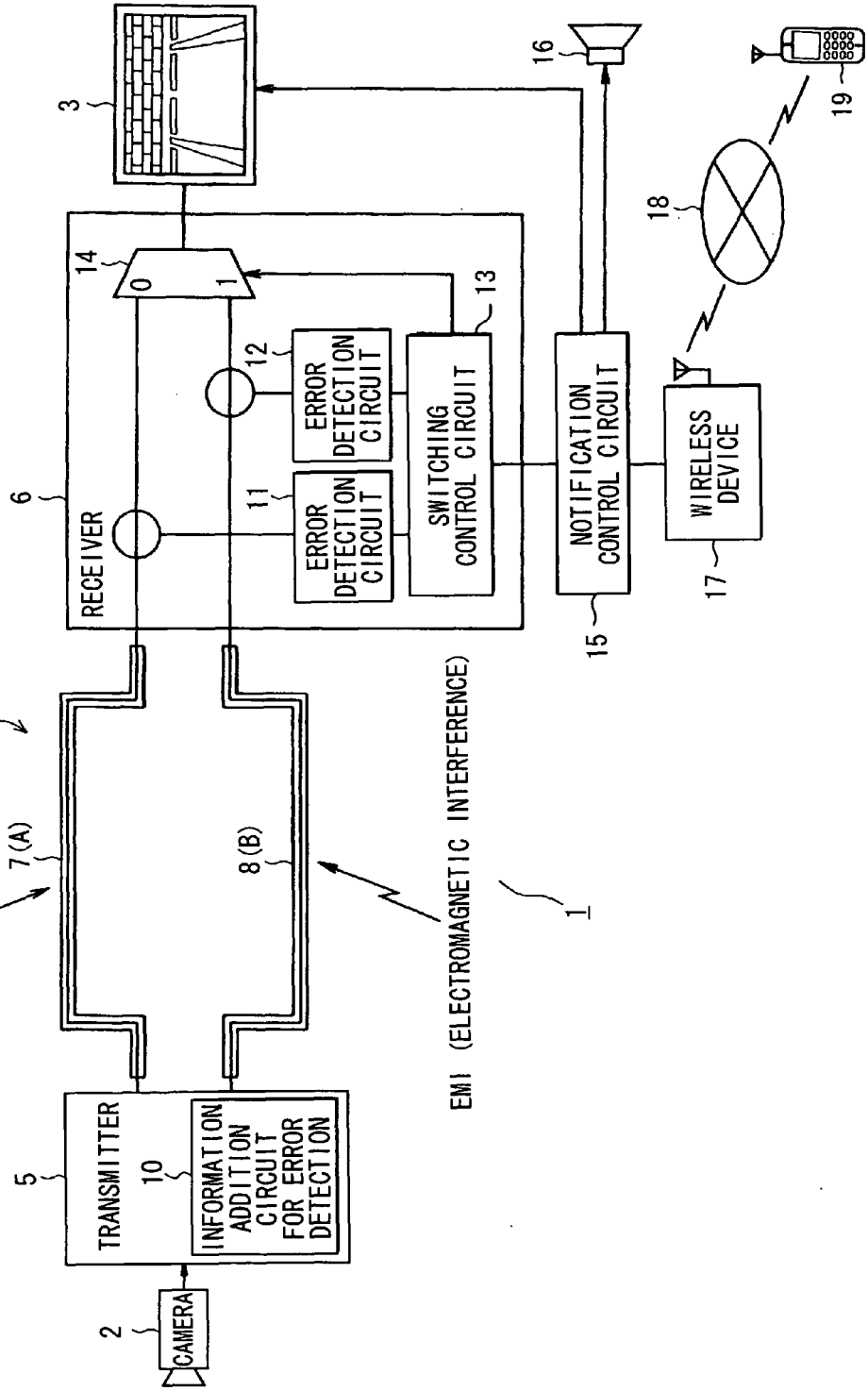
FIG. 1 is a functional block diagram showing a configuration of a periphery monitoring system according to the first embodiment of the present invention.
Figure 2:
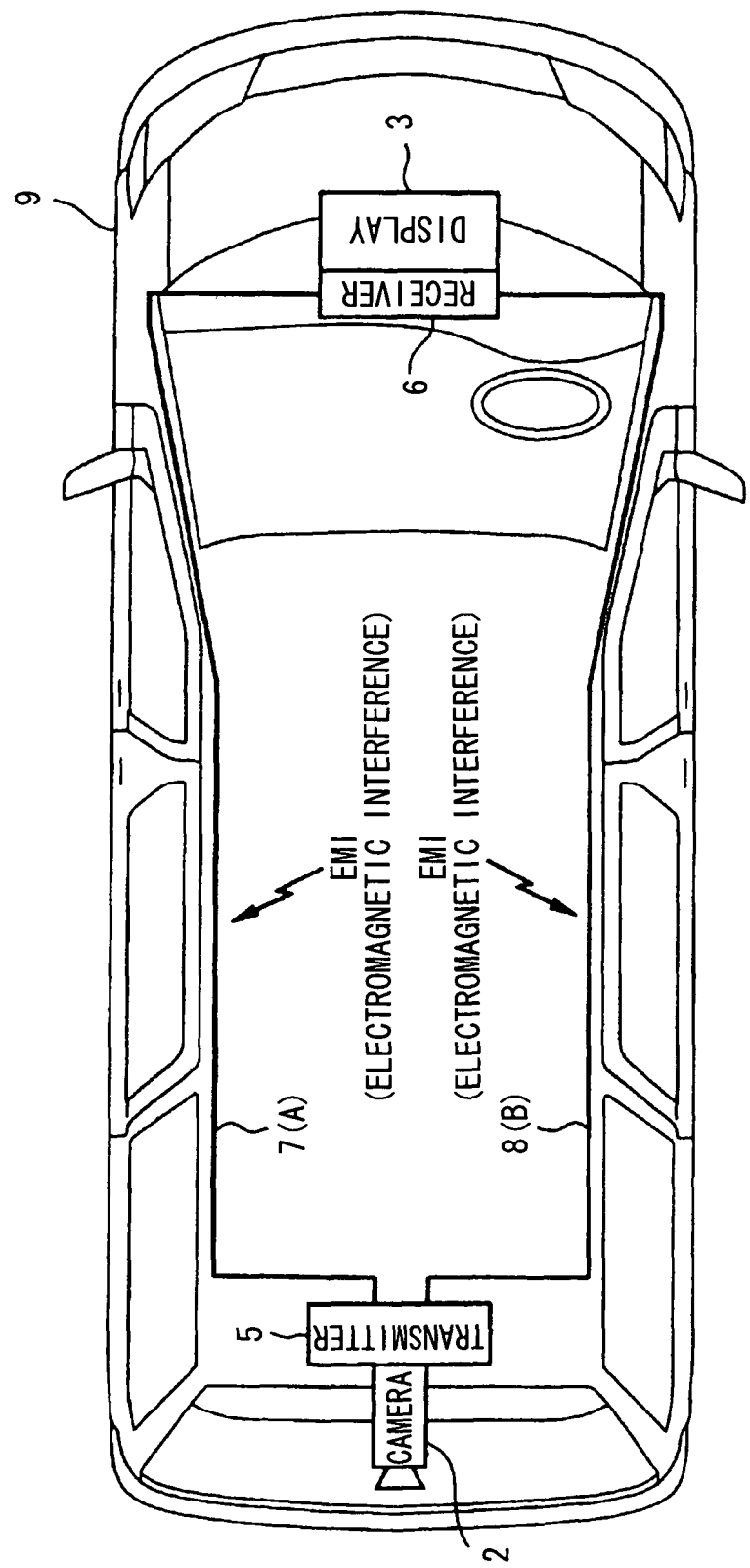
FIG. 2 is a view showing an arrangement of transmission cables in a movable object.

FIG. 1 is a block diagram showing an overview of the vehicle periphery monitoring system. FIG. 2 is a view showing components of the vehicle periphery monitoring system in a vehicle when viewed from the upper side. As shown in FIG. 1, the vehicle periphery monitoring system 1 includes a camera (imaging device) 2, a display device 3, and a transmission device 4. The display device 3 receives an image signal from the camera 2 and causes an indication screen to indicate an image of the image signal. The transmission device 4 transmits the image signal from the camera 2 to the display device 3. The vehicle periphery monitoring system 1 functions as an operation supporting device.

The transmission device 4 includes two transmission cables 7 and 8 connecting a transmitter 5 with a receiver 6. The transmitter 5 is provided on the side of the camera 2 and electrically connected to the camera 2. The receiver 6 is provided on the side of the display device 3 and electrically connected to the display device 3.

As shown in FIG. 2, the camera 2 is located in the backmost part of the vehicle 9, for example. The camera 2 is equipped with the transmitter 5. The camera 2 includes one camera device or multiple camera devices directed to the outside of the vehicle 9 to obtain an image of the periphery of the vehicle 9. For example, the display device 3 is located near the lateral side of a driver seat in the vehicle 9 to be visually recognized by a driver. The display device 3 is equipped with the receiver 6.

In the vehicle 9, two or more transmission cables 7 and 8 are laid as a transmission path. The camera 2 and the display device 3 are spaced from each other by a predetermined distance such as several meters. Therefore, the transmission cables 7 and 8 are provided to connect the camera 2 with the display device 3 therebetween. The transmission cable 7 functions as a main cable (main transmission system A, first transmission path) in a normal condition. The transmission cable 8 functions as an auxiliary cable (auxiliary transmission system B, second transmission path) in an abnormal condition.

The transmission cables 7 and 8 are spaced from each other. The vehicle 9 is substantially symmetric in the traveling direction. Therefore, the transmission cables 7 and 8 may be arranged along the right side and the left side of the vehicle 9.

Figure 3:
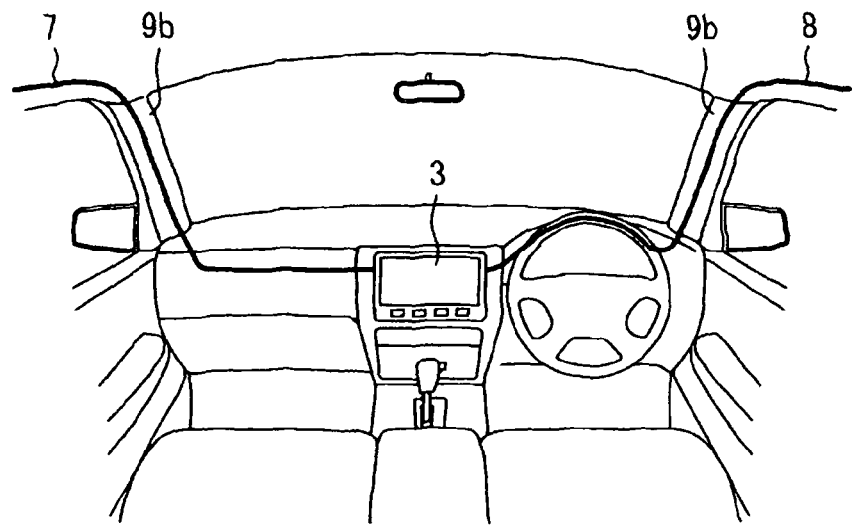
FIG. 3 is a view showing a first detailed example of an arrangement of transmission cables.
Figure 4:
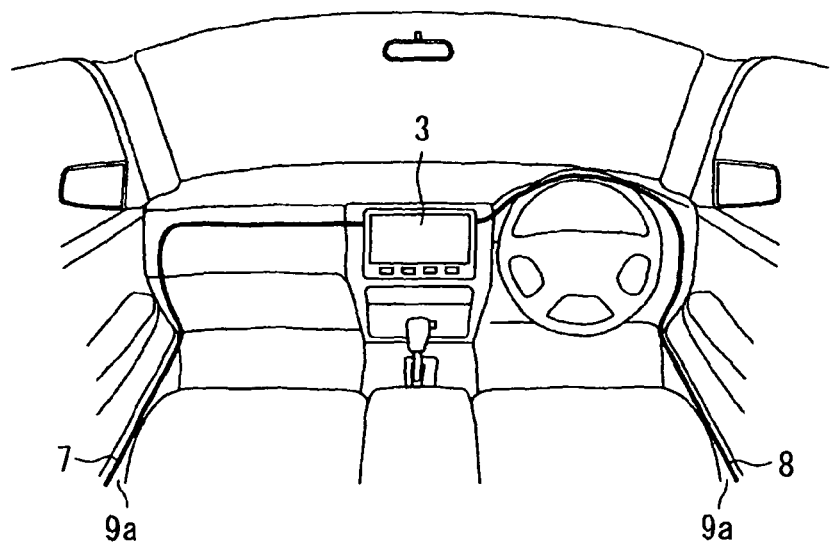
FIG. 4 is a view showing a second detailed example of an arrangement of transmission cables.

For example, it is supposed that the transmission cables 7 and 8 are located to extend from the rear side of the vehicle 9 to the front side of the vehicle 9. In this case, as shown in FIG. 3, the transmission cables 7 and 8 may be laid along the A-pillars 9b and the upper parts of the vehicle 9. Alternatively, as shown in FIG. 4, the transmission cables 7 and 8 may be located inside step covers 9a near the lateral sides of occupant's seats and laid along the lower parts of the vehicle 9. The transmission cables 7 and 8 may be spaced from each other in the vertical direction of the vehicle 9.

In actual operation of the vehicle, an intensive transmission disturbance, such as electromagnetic wave disturbance due to induction noise or cable disconnection caused by collision, may occur in a specific portion of the vehicle 9. When such an intensive transmission disturbance occurs in the transmission cables 7 and 8 and when the transmission cables 7 and 8 are close to each other, both transmission signals (image signal) through both the transmission cables 7 and 8 may be disturbed. In consideration of this problem, the transmission cables 7 and 8 are, in principle, spaced from each other, as described above.

In particular, various kinds of motors are used in the vehicle 9. Such motors may cause electromagnetic waves to exert adverse effects such as induction noise on the transmission cables 7 and 8. For example, a user may modify the vehicle 9 or may add various electric devices, such as option devices, to the vehicle 9 to result in amplification of such adverse effects. Image signals transmitted through the transmission cables 7 and 8 may receive such adverse effects. Consequently, image signals may be exerted with adverse effects and cannot be normally transmitted.

As described above, the transmission cables 7 and 8 are space from each other. Thereby, even when malfunction occurs in the image signal transmitted through one of the transmission cables 7 and 8, the image signal transmitted through the other of the transmission cables 7 and 8 may be possibly transmitted normally. Thus, even when intensive transmission disturbance occurs, the image signal can be possibly transmitted normally via one of the transmission cables 7 and 8.

Referring to FIG. 1, the camera 2 obtains a still picture or a moving picture of an image outside a vehicle 9 and transmits data of the image as an image signal to the transmitter 5. The transmitter 5 divides the image signal of one screen of the display device 3 into unit data (unit data item). The unit data represents a predetermined amount of information on the image signal.

The transmitter 5 includes an information addition circuit 10 for error detection. The information addition circuit 10 generates a redundant bit from the unit data. The redundant bit is used as error detection information for a predetermined error detection processing. The information addition circuit 10 adds the redundant bit to the unit data thereby to generate the image signal to be transmitted.

Figure 5A:
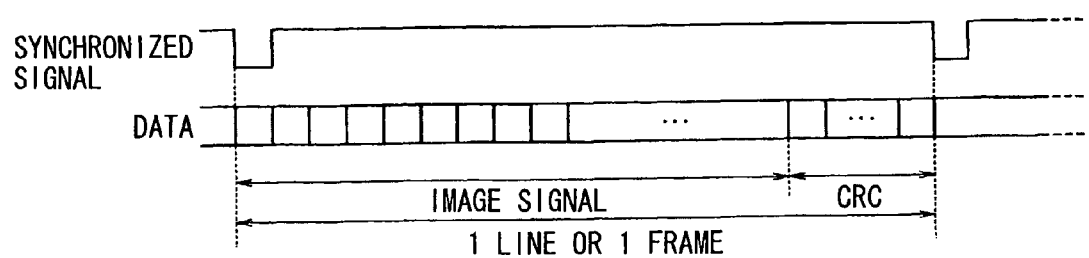
FIG. 5A is a chart showing a format of an image signal.
Figure 5B:
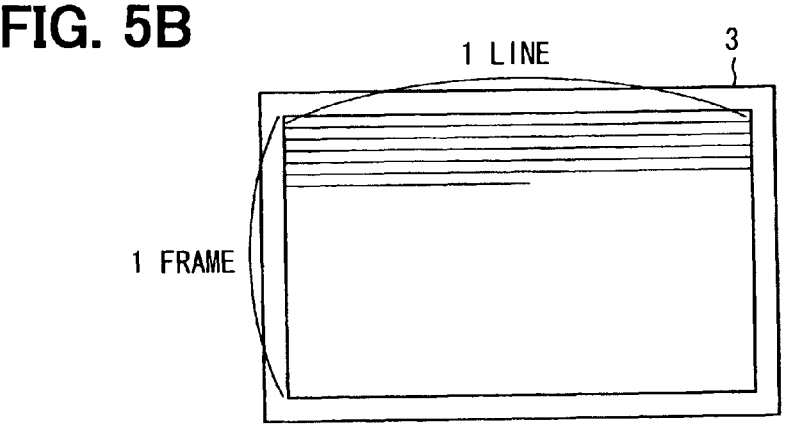
FIG. 5B is a view showing one frame of a screen.

The error detection processing may employ various processings, such as a cyclic redundancy check (CRC) method and a parity method. FIG. 5A shows a format of the image signal to be transmitted when a CRC method is employed. The one line shown in FIG. 5A is a horizontal one line in the screen of the display device 3 shown in FIG. 5B. One frame includes all lines of one still picture. In the present embodiment, information for one line or one frame is assigned as the unit data.

Referring to FIG. 1, the transmitter 5 transmits the image signal added with the redundant bit through the transmission cables 7 and 8. The receiver 6 receives an image signal transmitted from the transmitter 5. The receiver 6 includes error detection circuits 11 and 12, a switching control circuit 13, and a selector 14. The error detection circuits 11 and 12 are respectively provided to the transmission cables 7 and 8. The error detection circuit 11 detects an error in an image signal transmitted through the transmission cable 7. The error detection circuit 12 detects an error in an image signal transmitted through the transmission cable 8.

The switching control circuit 13 causes the selector 14 to switch signals based on error information obtained by the error detection circuits 11 and 12. The selector 14 selects one of an image signal transmitted through the transmission system A of the transmission cable 7 and an image signal transmitted through the transmission system B of the transmission cable 8. The selector 14 transmits the selected image signal to the display device 3. The display device 3 causes the indication screen to indicate an image of the selected image signal.

The switching control circuit 13 of the receiver 6 is connected to a notification control circuit 15. The notification control circuit 15 is connected to the display device 3 and a speaker 16. The notification control circuit 15 causes the display device 3 to indicate information such as various warnings and causes the speaker 16 to output sound such as an alarm, according to an instruction signal from the switching control circuit 13.

A wireless device 17 is connected to the notification control circuit 15. The notification control circuit 15 communicates with a portable terminal 19 via the wireless device 17 and a communication network 18. As follows, an operation of the above-described components will be described.

Figure 6:
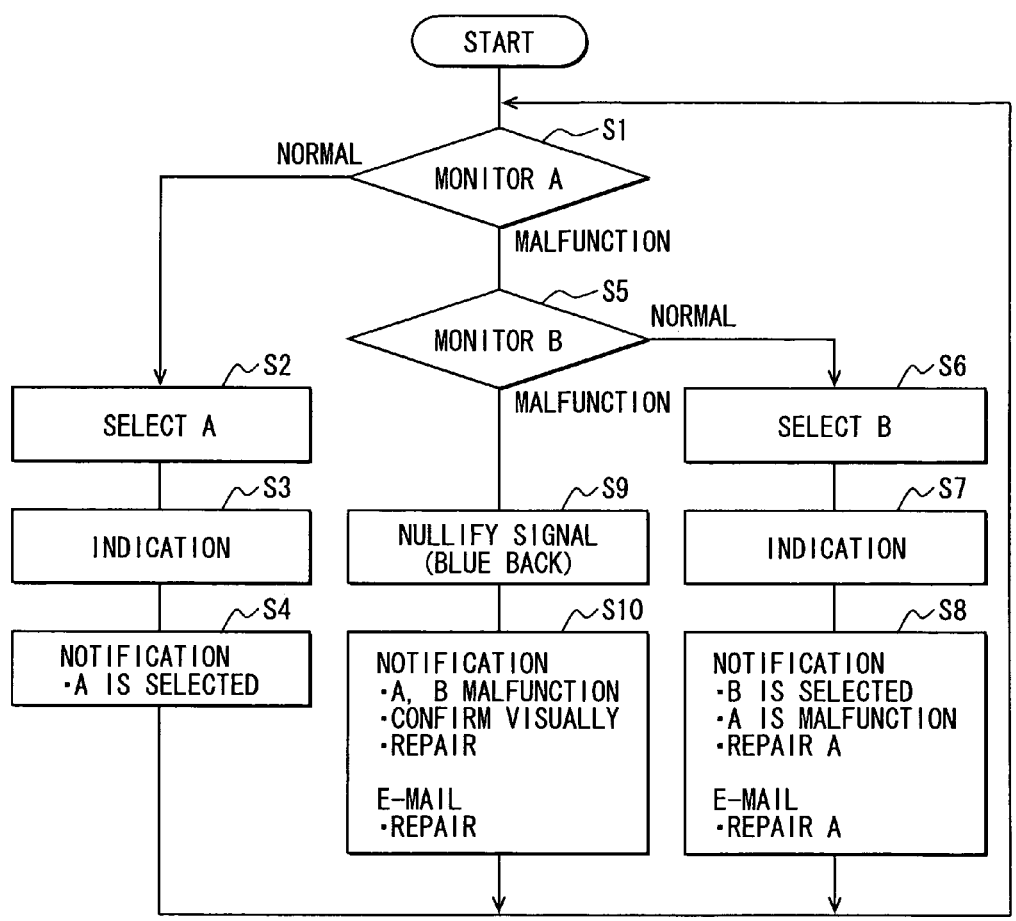
FIG. 6 is a flowchart showing an operation for monitoring a transmission path and an operation when malfunction occurs in the transmission path according to the first embodiment.
Figure 7:
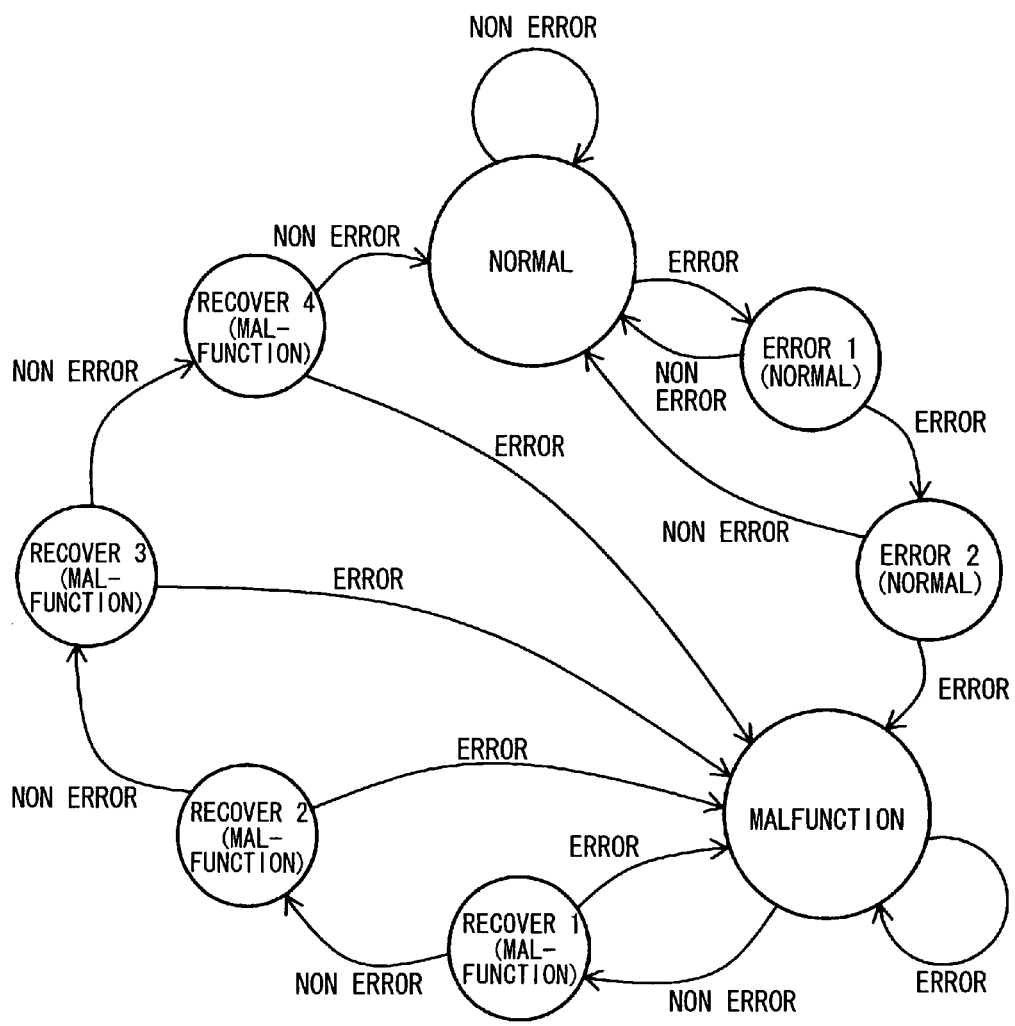
FIG. 7 is a state transition diagram showing a malfunction determination method for the transmission path.

FIG. 6 is a flow chart showing an operation when a malfunction occurs in a transmission path. FIG. 7 is a state transition diagram showing a malfunction determination method for the transmission path. In FIG. 6, in a normal condition, the receiver 6 causes the error detection circuit 11 and the switching control circuit 13 to monitor a transmission state of the transmission system A of the transmission cable 7 (S1). On condition that the transmission state of the transmission system A is determined to be normal (S1: normal), the switching control circuit 13 performs a switching control to cause the selector 14 to select the transmission cable 7 and outputs an image signal transmitted through the transmission system A (S2). The display device 3 causes the screen to indicate an image according to the image signal (S3). The notification control circuit 15 causes the display device 3 and/or the speaker 16 to indicate and/or announce that the main transmission system A is selected, as needed (S4). Thus, the processing returns to step S1. When it is determined that a malfunction occurs in the transmission state of the transmission system A (S1: malfunction), the processing proceeds to monitoring of the transmission state of the transmission system B (S5).

As follows, a malfunction determination method for the transmission systems A and B will be described with reference to FIG. 7. As shown in FIG. 5A, the transmitter 5 divides an image signal into unit data components (for example, one line, one frame) and transmits the divided unit data components to the receiver 6. It is noted that a transmission disturbance, such as induction noise, occurs in the course of the transmission path inside of the vehicle 9. Such induction noise may be a temporary disturbance caused when the rotation speed of the motor in the vehicle 9 satisfies a specific condition. In such a case, disturbance may not continue to exert permanent adverse effect.

In consideration of such a case, the present embodiment employs a malfunction determination method for the transmission systems A and B shown in FIG. 7. In FIG. 7, when three continuous errors are detected in the unit data in a normal state (real normal state), it is determined that malfunction (abnormal) occurs. Therefore, even when one error or two errors are detected, the normal condition (temporary normal condition) is maintained. In this case, when an error is not detected in the subsequent determination, the state returns to the real normal condition.

In FIG. 7, when it is once determined that malfunction occurs, the status will not return to the real normal condition, as long as it is determined that an error is not in the unit data continuously for five times. In the present instance, the number of five for determination of the real normal condition is set to be greater than the number of three for determination that malfunction occurs.

Therefore, even when it is determined that an error is not in the unit data continuously for once to four times, the status will be determined that malfunction occurs if the subsequent determination is an error. In this way, even in a case where one transmission system is once determined that malfunction occurs, the one transmission system can be used in a normal condition after five continuous normal determination. In addition, when one transmission system is once determined that malfunction occurs, the one transmission system is hard to be determined to be normal again. In this way, use of a transmission system, which is possibly low in the transmission efficiency, can be effectively avoided. The number of the continuous determination to be normal or abnormal (malfunction) may be arbitrary determined.

Referring to FIG. 6, when it is determined that malfunction occurs in the transmission system A (S1), the transmission system B is selected (S6) as long as the transmission system B is determined to be normal (S5: normal). In this case, indication of an image on the screen is performed (S7) similarly to the above-described way. In addition, the display device 3 and the speaker 16 are caused to notify that the main transmission system A malfunctions, and the sub-transmission system B is selected, as needed (S8). Specifically, the notification control circuit 15 may cause the display device 3 and/or the speaker 16 to indicate a message and/or to output a sound to notify that the sub-transmission system B is selected, the main transmission system A malfunctions, and please promptly repair the main transmission system A. In this way, a user, in particular a driver of the vehicle 9 can be notified of malfunction of the transmission system A to accelerate the user to repair the transmission system A.

It is noted that the portable terminal 19 may be registered in the receiver 6 or the notification control circuit 15. In this case, the registered portable terminal 19 may be caused to send an E-mail via the wireless device 17 and the communication network 18 to notify the malfunction. A user may be used to operate the portable terminal 19. In this case, even if the user forgets that the malfunction occurs in the transmission system A, the user can remind that with reference to the contents of the E-mail received by the portable terminal 19. Thus, the user can appropriately repair the transmission system A.

Referring to FIG. 6, when it is determined that malfunction occurs in both the transmission system A and the transmission system B (S1, S5: malfunction), the switching control circuit 13 does not cause the selector 14 to output a selected signal. Thereby, an image signal is nullified, and the display device 3 is prohibited from indicating an image of the image signal (S9). In this case, the display device 3 indicates a blue-back screen and disables a user to see an image of the camera 2. Further, the display device 3 and the speaker 16 are caused to notify that malfunction occurs in both the main transmission system A and the sub-transmission system B, as needed (S10).

Specifically, the notification control circuit 15 causes the display device 3 and/or the speaker 16 to indicate an image and/or to output a voice message to notify that malfunction occurs in both the main transmission system A and the sub-transmission system B, please visually confirm safety, and please repair promptly. In this way, a user, in particular a driver of the vehicle 9 can be notified of malfunction of both the transmission system A and the transmission system B to accelerate the user to repair the transmission system A and the transmission system B. In addition, the display device 3 and the speaker 16 are caused to notify a user of necessity of visual confirmation around the vehicle 9. Thus, a user such as a driver can be notified of necessity of direct sensing hazard around the vehicle 9. The warning information may be provided by blinking the indication on the display device 3 or by interposing an alarm sound in the output sound of the speaker 16 so as to warn a user.

It is noted that the portable terminal 19 may be registered in the receiver 6 or the notification control circuit 15. In this case, the registered portable terminal 19 may be caused to send an E-mail via the wireless device 17 and the communication network 18 to notify the malfunction. A user may be used to operate the portable terminal 19. In this case, even if the user forgets that the malfunction occurs in both the transmission system A and the transmission system B, the user can remind that with reference to the contents of the E-mail received by the portable terminal 19. Thus, the user can appropriately repair the transmission system A and the transmission system B.

According to the present embodiment, the transmitter 5 adds the information (error detection information) for error detection to the unit data to generate an image signal to be indicated on the display device 3. The transmitter 5 transmits the generated image signal. Further, it is determined that malfunction occurs in the transmission state of the transmission system A on condition that errors are continuously detected in unit data transmitted to the receiver 6 through the transmission system A. In this case, the image signal transmitted through the transmission system B is selected, instead of that transmitted through the transmission system A.

In this way, the receiver 6 does not determine malfunction to be occurring when errors are not detected in continuous unit data. Thus, wrong detection of malfunction can be reduced. Consequently, unnecessary switching of the transmission system A and the transmission system B can be avoided. Thus, selection of the transmission system A and the transmission system B can be performed with high reliability.

It is supposed that the transmitter 5 transmits an image signal, and the receiver 6 operates to detect an error in the transmitted image signal, after determination that malfunction occurs in the transmission state of the transmission system A or B. In this case, on condition that the receiver 6 does not detect errors continuously for five times (greater than three or more times) in the unit data, it is determined that the transmission state of the transmission system A or B, in which malfunction has been once determined to be occurring, to be returned to the normal condition.

Accordingly, even if it is determined that malfunction occurs in the transmission system A or B, the transmission system A or B, in which malfunction has been once determined to be occurring, can be used in the normal condition when the transmission system A or B once satisfies the condition. In addition, when one transmission system A or B is once determined to cause malfunction, the one transmission system A or B is hard to be determined to be normal again. In this way, use of a transmission system A or B, which is possibly low in the transmission efficiency, can be effectively avoided. Thus, selection of the transmission system A and the transmission system B can be performed with high reliability.

When it is determined that malfunction occurs in the main transmission system A, the transmission system B is used to transmit an image signal. When it is determined that the main transmission system A is normal, the main transmission system A is used instead of the transmission system B to transmit an image signal. In this way, the transmission system B can be used as an auxiliary system.

Second Embodiment

Figure 8:
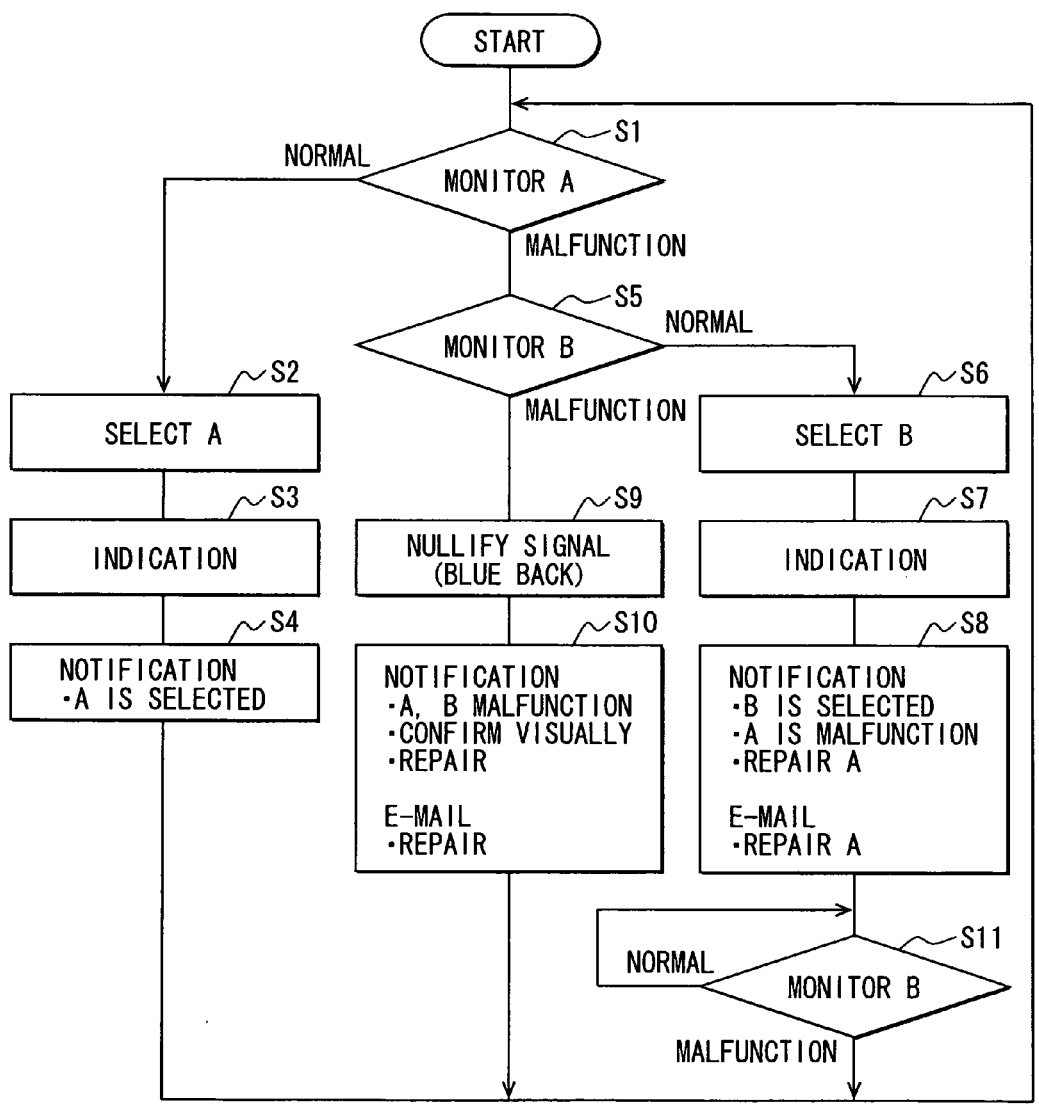
FIG. 8 is a flowchart showing an operation for monitoring a transmission path and an operation when malfunction occurs in the transmission path according to the second embodiment.

FIG. 8 shows the second embodiment. The second embodiment is different from the first embodiment in the following subjects. In the second embodiment, when it is once determined that malfunction occurs in one transmission path, another transmission path is used. In this case, regardless of change in the condition of another transmission path, use of another transmission path is continued unless malfunction occurs in another transmission path. As follows, the difference will be described in detail.

As shown in FIG. 8, when malfunction occurs in the transmission system A and when the transmission system B is normal, warning is made at step S7. Subsequent to the warning at step S7, the receiver 6 does not return to step S1, as long as a normal determination of the transmission system B is made (S11: normal). When it is determined that malfunction occurs in the transmission system B (S11: malfunction), the processing returns to step S1, and the receiver 6 again determines whether the transmission system A is normal. In this case, when it is determined that malfunction occurs also in the transmission system A, abnormal determination is made to both the transmission systems A and B. Thus, at step S10, it is notified that malfunction occurs in both the transmission systems A and B.

According to the present embodiment, when it is determined that malfunction occurs in the transmission system A, the transmission system B is used. In this case, an image signal is continually transmitted through the transmission system B without using the transmission system A, unless it is determined that malfunction occurs in the transmission system B. Therefore, both the transmission systems A, B can be used as main transmission paths.

Third Embodiment

Figure 9:
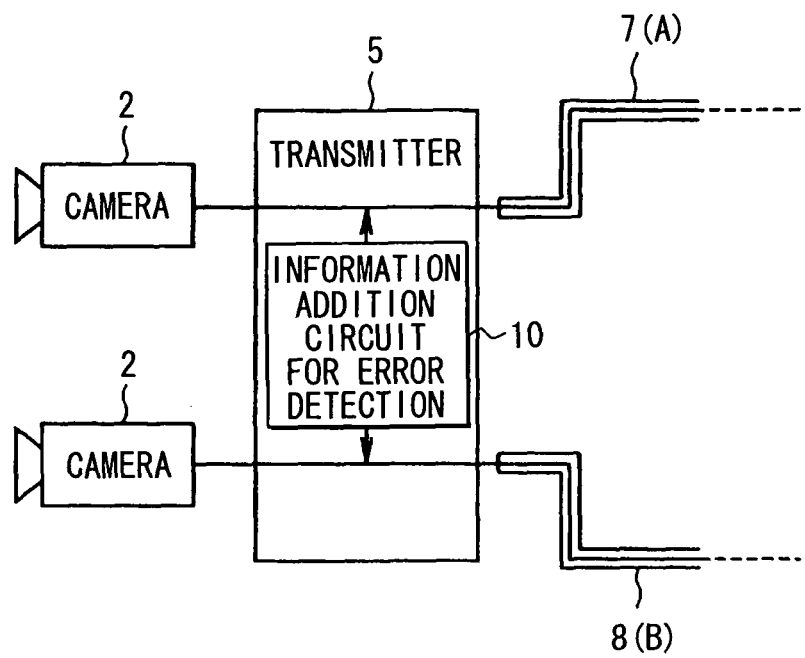
FIG. 9 is a block diagram showing a configuration of imaging devices according to the third embodiment.

FIG. 9 shows the third embodiment. The third embodiment is different from the first and second embodiments in two imaging devices respectively provided to the first transmission path and the second transmission path. As shown in FIG. 9, the transmission systems A, B are respectively connected to the cameras 2, 2. The transmitter 5, transmits the image signals obtained by the cameras 2, 2, respectively through the transmission systems A, B. In the present embodiment, the main camera 2 and the sub-camera 2 are provided. Even when malfunction occurs in one camera 2, the other camera 2 can be normally used. Thus, failure cause in one camera 2 can be complemented by the other camera 2.

Other Embodiment

The present invention is not limited to the above embodiments. For example, the present invention may be modified or extended, as follows. The movable object is not limited to the vehicle 9 (automobile). The movable object may be another vehicle such as a motor cycle or a bicycle or may be a pedestrian or the like. In the above embodiments, the transmission cables 7, 8 are laid on the front and rear sides to construct the transmission systems A, B so as to transmit an image signal on the rear side of the vehicle 9. Alternatively, the camera 2 can be provided in another location of the vehicle such as an exterior of an interior of the vehicle 9 (in particular, a blind corner) to construct the transmission systems A, B.

In the above embodiments, the unit data is information of one line or information of one frame. Alternatively, the data amount of the unit data may be arbitrary changed or may be arbitrary controllable (variable). In the above embodiments, the transmission system of an image is embodied by a digital transmission method. Alternatively, the transmission system of an image may be embodied by an analog transmission method.

For example, the national television system committee system (NTSC system) is generally used as a collar television format in Japan and the United States. In the NTSC system, an image signal has synchronized signals including a horizontal synchronized signal, a color synchronized signal, and a vertical synchronized signal.

In transmission of an image signal between the transmitter 5 and the receiver 6 in this system, it may be determined that an error occurs on condition that the receiver 6 makes a wrong detection of at least one of the synchronized signals.

In the above embodiments, the transmission cables 7, 8 are used for the transmission systems A, B (first and second transmission paths). Alternatively, a wireless transmission path may be provided, and two or more channels may be provided.

According to one example of the above embodiments, a movable object periphery monitoring system includes a transmission device including a transmitter and a receiver configured to transmit an image signal of an image of a periphery of a movable object from an imaging device to a display device near a driver of the movable object. The transmission device is configured to transmit an image signal from the transmitter to the receiver through a first transmission path and a second transmission path. The transmitter is configured to add error detection information to each unit data item of an indication screen of the display device to generate an image signal and transmit the image signal. The receiver is configured to: i) detect an error in the first transmission path using the error detection information; and ii) when continuously detecting an error in multiple transmitted unit data items, determine that malfunction occurs in a transmission state of the first transmission path to select an image signal transmitted through the second transmission path instead of an image signal transmitted through the first transmission path.

According to the present structure, the imaging device obtains an image of a periphery of the movable object, and the transmitter transmits the image signal to the receiver through the first transmission path and the second transmission path. More specifically, the transmitter adds the information for error detection to each unit data item to generate an image signal to be indicated on the display device. The transmitter transmits the generated image signal. Further, it is determined that malfunction occurs in the transmission state of the first transmission path on condition that errors are continuously detected in unit data items transmitted to the receiver through the first transmission path. In this case, the image signal transmitted through the second transmission path is selected, instead of the image signal transmitted through the first transmission path.

In this way, the receiver does not determine that malfunction occurs when errors are not detected in continuous multiple unit data items. Thus, wrong detection of malfunction can be reduced. Consequently, unnecessary switching of the first transmission path and the second transmission path can be avoided. Thus, selection of the transmission paths can be performed with high reliability.

According to one example of the above embodiments, a movable object periphery monitoring system includes a transmission device including a transmitter and a receiver configured to transmit an image signal of an image of a periphery of a movable object from an imaging device to a display device near a driver of the movable object. The transmission device is configured to transmit an image signal from the transmitter to the receiver through a first transmission path and a second transmission path. The transmitter is configured to add error detection information to each unit data item of an indication screen of the display device to generate an image signal and transmit the image signal. The receiver is configured to detect an error using the error detection information. When detecting an error in a first number of unit data item, the receiver determines that malfunction occurs in a transmission state of one of the first transmission path and the second transmission path. Thereafter, when not detecting an error continuously in a second number of data unit items in detection of an error in an image signal transmitted from the transmitter, the receiver determines that the one of the first transmission path and the second transmission path has recovered from a malfunction state to be a normal state. The first number is one or more. The second number is greater than the first number.

According to the present structure, the imaging device obtains an image of a periphery of the movable object, and the transmitter transmits the image signal to the receiver through the first transmission path and the second transmission path. The transmitter adds error detection information to each unit data item of the indication screen of the display device to generate an image signal and transmits the image signal. The receiver determines that malfunction occurs in a transmission state of one of the first transmission path and the second transmission path on condition that the receiver detects an error in one data unit item or multiple unit data items. Thereafter, the receiver determines that the one of the first transmission path and the second transmission path has recovered from a malfunction state to a normal state in detection of an error in an image signal transmitted from the transmitter, on condition that the receiver does not detect an error continuously in a number of unit data items greater than a number of the one data unit item or the multiple unit data items detected by the receiver when the receiver determines the malfunction state.

In this way, even when it is once determined that malfunction occurs in the transmission path, the transmission device can be used in a condition where the transmitter, which was once determined to be in a malfunction state, is determined to be in a normal state. In addition, when one transmission path is once determined to be in a malfunction state, the one transmission path is hard to be determined to be normal again. In this way, use of a transmission path, which is possibly low in the transmission efficiency, can be effectively avoided. Thus, selection of the transmission paths can be performed with high reliability.

The unit data item may be data of one line of the indication screen of the display device. Alternatively, the unit data item may be data of one frame of the indication screen of the display device. The imaging device may include two imaging device elements, and the first transmission path and the second transmission path may be respectively provided with the two imaging device elements. In this case, even when one imaging device element causes a defect such as malfunction, the other imaging device element operates normally. Thereby, such a defect can be effectively complemented.

Error detection may be performed using error detection information being a redundant bit added to an image signal for a predetermined error detecting method such as a cyclic redundancy check (CRC) method or a parity method.

Error detection may be performed using error detection information including at least one of a horizontal synchronized signal, a color synchronized signal, and a vertical synchronized signal added to an image signal.

The transmitter and the receiver may be configured to communicate the imaging device with the indication device via wireless communications. The wireless communications may have two wireless communication channels to configure the first transmission path and the second transmission path.

The transmission device may be configured to transmit an image signal through the second transmission path when it is determined that malfunction occurs in the first transmission path. The transmission device may be configured to transmit an image signal through the first transmission path instead of the second transmission path when it is determined that the first transmission path is normal. In this way, the second transmission path can be used as an auxiliary path.

The transmission device may be configured to transmit an image signal through the second transmission path when it is determined that malfunction occurs in the first transmission path. The transmission device may be configured to transmit an image signal through the second transmission path without using the first transmission path until it is determined that malfunction occurs in the second transmission path. In this way, both the first transmission path and the second transmission path can be used as main paths.

According to one example of the above embodiments, a movable object periphery monitoring, system includes a transmission device including a transmitter and a receiver configured to transmit an image signal of an image of a periphery of a movable object from an imaging device to a display device near a driver of the movable object. The transmission device includes a first transmission cable and a second transmission cable for forming a first transmission path and a second transmission path to connect the transmitter with the receiver. The transmission device is configured to transmit an image signal through the first transmission path and the second transmission path. The first transmission cable and the second transmission cable are respectively laid in a first wiring path and a second wiring path, and the first wiring path and the second wiring path are spaced from each other in the movable object.

According to the present structure, the imaging device obtains an image of a periphery of the movable object, and the transmitter transmits the image signal to the receiver through the first transmission path and the second transmission path. Thus, an image signal can be transmitted through the first transmission path and the second transmission path by providing the two transmission cables to the transmission device to form a cable connection between the transmitter and the receiver. The two transmission cables are spaced from each other in the movable object. Therefore, even when intensive transmission disturbance such as a shock, an electromagnetic wave noise, and the like occurs in a specific portion of the movable object to cause a transmission disturbance in one transmission cable, an image signal can be transmitted through the other transmission cable. Thereby, a transmission path is securable.

The imaging device may be provided on a rear side of the movable object, and the display device may be provided on a front side of the movable object. In this case, the two transmission cables may be respectively provided on the right and left sides in the movable object and spaced from each other. Alternatively, the two transmission cables may be spaced from each other in the vertical direction.

A notification unit may be provided to notify information that malfunction occurs in the first transmission path when it is determined that malfunction occurs in the first transmission path. In this way, a user such as a driver moving with the movable object can be notified that malfunction occurs in the first transmission path. Thereby, a user can be requested to repair the movable object.

The first transmission path and the second first transmission path may include only two paths. In this case, when it is determined that malfunction occurs in both the paths, a notification unit may notify information that malfunction occurs in both the first transmission path and the second transmission path. In this way, a user such as a driver moving with the movable object can be notified that malfunction occurs in both the first transmission path and the second transmission path. Thereby, a user can be requested to repair the movable object.

For example, when the imaging device breaks down and when a driver erroneously recognizes that the imaging device normally operates, the user may operate the movable object without recognizing such a dangerous state. According to the above-described example, a notification unit may give warning information to request a user to visually confirm the periphery of the movable object. Thus, the user can be notified of a state in which the user should visually and directly confirm the periphery of the movable object.

Even when the notification unit is caused to notify the information, a user may forget the notification. According to the above-described example, a portable terminal registered beforehand may be transmitted with information representing that malfunction occurs in a transmission path. In this way, even when a user forgets such malfunction, the user can remember that malfunction occurs in the transmission path according to contents transmitted to the portable terminal, which can be easily used by the user. Thereby, the user can appropriately fix the transmission path.

In this case, data transmission of an error code representing a cause of the malfunctions may be performed to the portable terminal. In this way, a user can appropriately tell an abnormal condition of the transmission path to an engineer such as a car dealer staff when the movable object is an automobile.

The above processings such as calculations and determinations are not limited being executed by the transmitter 5, the receiver 6, the notification control circuit 15, and the like. The control unit may have various structures including the transmitter 5, the receiver 6, the notification control circuit 15 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A movable object periphery monitoring system comprising:
    a transmission device including a transmitter and a receiver configured to transmit an image signal of an image of a periphery of a movable object from an imaging device to a display device near a driver of the movable object, using the transmitter and the receiver through a first transmission path and a second transmission path, wherein
    the transmitter is configured to add error detection information to each unit data item of an indication screen of the display device to generate an image signal and transmit the image signal,
    the receiver is configured to detect an error in the first transmission path using the error detection information; and
    the receiver is further configured to, when continuously detecting an error in a plurality of transmitted unit data items, determine that malfunction occurs in a transmission state of the first transmission path and select an image signal transmitted through the second transmission path instead of an image signal transmitted through the first transmission path.

2. The movable object periphery monitoring system according to claim 1, wherein the unit data item includes data corresponding to one line of the indication screen of the display device.

3. The movable object periphery monitoring system according to claim 1, wherein the unit data item includes data corresponding to one frame of the indication screen of the display device.

4. The movable object periphery monitoring system according to claim 1, wherein
    the imaging device includes a first imaging device element and a second imaging device element, and
    the first transmission path and the second transmission path are respectively provided with the first imaging device element and the second imaging device element.

5. The movable object periphery monitoring system according to claim 1, wherein the error detection information is a redundant bit added in an image signal for a predetermined error detecting method including a cyclic redundancy check method or a parity method.

6. The movable object periphery monitoring system according to claim 1, wherein the error detection information includes at least one of a horizontal synchronized signal, a color synchronized signal, and a vertical synchronized signal added to an image signal.

7. The movable object periphery monitoring system according to claim 1, wherein the first transmission path and the second transmission path respectively include a first channel and a second channel for wireless connections between the imaging device and the indication device.

8. The movable object periphery monitoring system according to claim 1, wherein
    the transmission device is further configured to transmit an image signal through the second transmission path when the receiver determines that malfunction occurs in the first transmission path; and the transmission device is further configured to transmit an image signal through the first transmission path instead of the second transmission path when the receiver determines that the first transmission path is normal.

9. The movable object periphery monitoring system according to claim 1, wherein
the transmission device is further configured to transmit an image signal through the second transmission path when the receiver determines that malfunction occurs in the first transmission path, and
the transmission device is further configured to transmit an image signal through the second transmission path without using the first transmission path until the receiver determines that malfunction occurs in the second transmission path.

10. The movable object periphery monitoring system according to claim 1, further comprising:
a notification unit mounted to the movable object and configured to notify information that malfunction occurs in the first transmission path when it is determined that malfunction occurs in the first transmission path.

11. The movable object periphery monitoring system according to claim 1, wherein
the first transmission path and the second transmission path include only two paths,
the movable object periphery monitoring system further comprising:
a notification unit mounted in the movable object and configured to, when it is determined that malfunction occurs in both the first transmission path and the second transmission path:
notify information that malfunction occurs in both the first transmission path and the second transmission path; and
notify warning information to cause a user to visually confirm a periphery of the movable object.

12. The movable object periphery monitoring system according to claim 1, further comprising:
a transmission unit configured to transmit data to a portable terminal registered beforehand,
wherein the data includes information that malfunction occurs in the transmission path and an error code representing a cause of the malfunction.

13. A movable object periphery monitoring system comprising:
a transmission device including a transmitter and a receiver configured to transmit an image signal of an image of a periphery of a movable object from an imaging device to a display device near a driver of the movable object, using the transmitter to the receiver through a first transmission path and a second transmission path,
wherein the transmitter is configured to add error detection information to each unit data item of an indication screen of the display device to generate an image signal and transmit the image signal,
the receiver is configured to detect an error using the error detection information,
the receiver is further configured to, when detecting an error in a first number of unit data item, determine that malfunction occurs in a transmission state of one of the first transmission path and the second transmission path in a first instance,
the receiver is further configured to, when not detecting an error continuously in a second number of data unit items, determine that the one of the first transmission path and the second transmission path recovers to be normal in a second instance subsequent to the first instance,
the first number is one or more, and
the second number is greater than the first number.

14. The movable object periphery monitoring system according to claim 13, wherein the unit data item includes data corresponding to one line of the indication screen of the display device.

15. The movable object periphery monitoring system according to claim 13, wherein the unit data item includes data corresponding to one frame of the indication screen of the display device.

16. The movable object periphery monitoring system according to claim 13, wherein
the imaging device includes a first imaging device element and a second imaging device element, and
the first transmission path and the second transmission path are respectively provided with the first imaging device element and the second imaging device element.

17. The movable object periphery monitoring system according to claim 13, wherein the error detection information is a redundant bit added in an image signal for a predetermined error detecting method including a cyclic redundancy check method or a parity method.

18. The movable object periphery monitoring system according to claim 13, wherein the error detection information includes at least one of a horizontal synchronized signal, a color synchronized signal, and a vertical synchronized signal added to an image signal.

19. The movable object periphery monitoring system according to claim 13, wherein the first transmission path and the second transmission path respectively include a first channel and a second channel for wireless connections between the imaging device and the indication device.

20. The movable object periphery monitoring system according to claim 13, wherein
the transmission device is further configured to transmit an image signal through the second transmission path when the receiver determines that malfunction occurs in the first transmission path; and
the transmission device is further configured to transmit an image signal through the first transmission path instead of the second transmission path when the receiver determines that the first transmission path is normal.

21. The movable object periphery monitoring system according to claim 13, wherein
the transmission device is further configured to transmit an image signal through the second transmission path when the receiver determines that malfunction occurs in the first transmission path, and
the transmission device is further configured to transmit an image signal through the second transmission path without using the first transmission path until the receiver determines that malfunction occurs in the second transmission path.

22. The movable object periphery monitoring system according to claim 13, further comprising:
a notification unit mounted to the movable object and configured to notify information that malfunction occurs in the first transmission path when it is determined that malfunction occurs in the first transmission path.

23. The movable object periphery monitoring system according to claim 13, wherein
the first transmission path and the second transmission path include only two paths,
the movable object periphery monitoring system further comprising:

a notification unit mounted in the movable object and configured to, when it is determined that malfunction occurs in both the first transmission path and the second transmission path:

notify information that malfunction occurs in both the first transmission path and the second transmission path; and notify warning information to cause a user to visually confirm a periphery of the movable object.

24. The movable object periphery monitoring system according to claim 13, further comprising:

a transmission unit configured to transmit data to a portable terminal registered beforehand, wherein the data includes information that malfunction occurs in the transmission path and an error code representing a cause of the malfunction.

25. A movable object periphery monitoring system comprising:

a transmission device including a transmitter and a receiver configured to transmit an image signal of an image of a periphery of a movable object from an imaging device to a display device near a driver of the movable object, wherein the transmission device further includes a first transmission cable and a second transmission cable for forming a first transmission path and a second transmission path to connect the transmitter with the receiver, the transmission device is configured to transmit an image signal through the first transmission path and the second transmission path, the first transmission cable and the second transmission cable are respectively laid in a first wiring path and a second wiring path, and the first wiring path and the second wiring path are spaced from each other in the movable object, wherein the first transmission path and the second transmission path include only two paths, the movable object periphery monitoring system further comprising:

a notification unit mounted in the movable object and configured to, when it is determined that malfunction occurs in both the first transmission path and the second transmission path:

notify information that malfunction occurs in both the first transmission path and the second transmission path; and notify warning information to cause a user to visually confirm a periphery of the movable object.

26. A method for controlling data transmission in a movable object periphery monitoring system configured to transmit an image signal of an image of a periphery of a movable object from an imaging device to a display device near a driver of the movable object using a transmitter and a receiver through a first transmission path and a second transmission path, the method comprising:

adding error detection information to each unit data item of an indication screen of the display device to generate an image signal in the transmitter;

transmitting the generated image signal from the transmitter; receiving the transmitted image signal by the receiver;

when continuously detecting an error in a plurality, of transmitted unit data items through the first transmission path by the receiver using the error detection information:

i) determining that malfunction occurs in a transmission state of the first transmission path by the receiver; and ii) selecting an image signal transmitted through the second transmission path instead of an image signal transmitted through the first transmission path by the receiver.

27. A method for controlling data transmission in a movable object periphery monitoring system configured to transmit an image signal of an image of a periphery of a movable object from an imaging device to a display device near a driver of the movable object using a transmitter and a receiver through a first transmission path and a second transmission path, the method comprising:

adding error detection information to each unit data item of an indication screen of the display device to generate an image signal in the transmitter;

transmitting the generated image signal from the transmitter;

receiving the transmitted image signal by the receiver;

when detecting an error in a first number of unit data item by the receiver using the error detection information, determining that malfunction occurs in a transmission state of one of the first transmission path and the second transmission path in a first instance; and when not detecting an error continuously in a second number of data unit items, determining that the one of the first transmission path and the second transmission path recovers to be normal in a second instance subsequent to the first instance, wherein the first number is one or more, and the second number is greater than the first number.

* * * * *